(12) United States Patent
Chalin

(10) Patent No.: US 6,398,239 B1
(45) Date of Patent: Jun. 4, 2002

(54) STEERABLE SUSPENSION SYSTEM

(75) Inventor: Thomas N. Chalin, Fairview, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 0 days.

(21) Appl. No.: 09/631,448

(22) Filed: Aug. 2, 2000

(51) Int. Cl.7 .............................................. B62D 7/22
(52) U.S. Cl. ...................... 280/89.1; 280/89; 280/445
(58) Field of Search .................... 280/89.1, 89.11, 280/89.12, 89, 445

(56) References Cited

U.S. PATENT DOCUMENTS

| | | | |
|---|---|---|---|
| 4,171,551 A | * 10/1979 | Hildebrand et al. | ............ 15/84 |
| 5,176,356 A | * 1/1993 | Lorbiecki et al. | ............ 248/577 |
| 5,620,194 A | * 4/1997 | Keeler et al. | ............. 280/81.6 |
| 5,802,980 A | * 9/1998 | Hofmiller | ................. 105/72.2 |
| 6,062,578 A | * 5/2000 | Richardson | ................ 280/81.6 |

OTHER PUBLICATIONS

IMT Ingersoll Self Steer Axle brochure, undated.
KGI Self Steer Axles Brochure, undated.
KGI Self Steer Axles catalog, Five Pages, including drawing No. K–B–324 Dated Aug. 27, 1998.
Watson & Chalin Mfg. drawing No. 980104 dated Mar. 24, 2000.
Watson & Chalin Mfg. drawing No. 980063 dated Mar. 26, 1998.
Watson & Chalin Mfg. drawing No. 980065 dated Nov. 4, 1998.
Watson & Chalin Mfg. drawing No. 12885 dated Oct. 11, 1995.

* cited by examiner

Primary Examiner—Kenneth R. Rice
Assistant Examiner—Christopher Buchanon
(74) Attorney, Agent, or Firm—Konneker & Smith, P.C.

(57) ABSTRACT

A steerable suspension system which includes a steering lockout feature is provided. In a described embodiment, an engagement member is displaced through an axle of the suspension system to prevent steering of the suspension system. The engagement member engages another engagement member attached to a tie rod of the suspension system.

18 Claims, 4 Drawing Sheets

STEERABLE SUSPENSION SYSTEM

BACKGROUND OF THE INVENTION

The present invention relates generally to vehicle suspension systems and, in an embodiment described herein, more particularly provides a steerable suspension system having a steering lockout feature.

A steerable suspension system typically has a steering knuckle attached at each opposite end of an axle thereof. It is at times desirable to prevent the steering knuckles from rotating, thereby temporarily preventing the suspension system from being steered. This may be the case, for example, when traveling at high speed or when backing up.

Various means of locking out a steerable suspension system have been used in the past. For example, tripover mechanisms, actuators pushing plungers toward and against steering knuckles, locking shock systems and actuators attached to brackets have been used. However, most of these are either unreliable, heavy, made up of relatively expensive nonstandard components, or time-consuming to assemble or manufacture.

From the foregoing, it can be seen that it would be quite desirable to provide a steerable suspension system which includes a steering lockout feature that uses industry standard components, is reliable, is relatively light in weight and may be readily and conveniently manufactured and assembled. It is accordingly one of the objects of the present invention to provide such a steerable suspension system.

SUMMARY

In carrying out the principles of the present invention, in accordance with an embodiment thereof, a steerable suspension system is provided which includes a unique steering lockout feature.

In one aspect of the invention, an engagement member is displaced through an axle of the suspension system and into engagement with another engagement member attached to a tie rod. This configuration places the engagement members in close proximity to each other in a way that eliminates or reduces the amount of bracketry needed and, thus, reduces the weight and complexity of the system.

In another aspect of the invention, one of the engagement members is displaced in a tube extending through the axle. This configuration is easily and inexpensively manufactured and gives superior support to the engagement member, as compared to an engagement member depending upon a bracket attached to the axle for its support.

In yet another aspect of the invention, an actuator displaces one of the engagement members through the axle. The actuator maybe attached to the tube extending through the axle. In this manner, the tube also provides enhanced support for the actuator. Alternatively, the tube may be externally attached to the axle.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
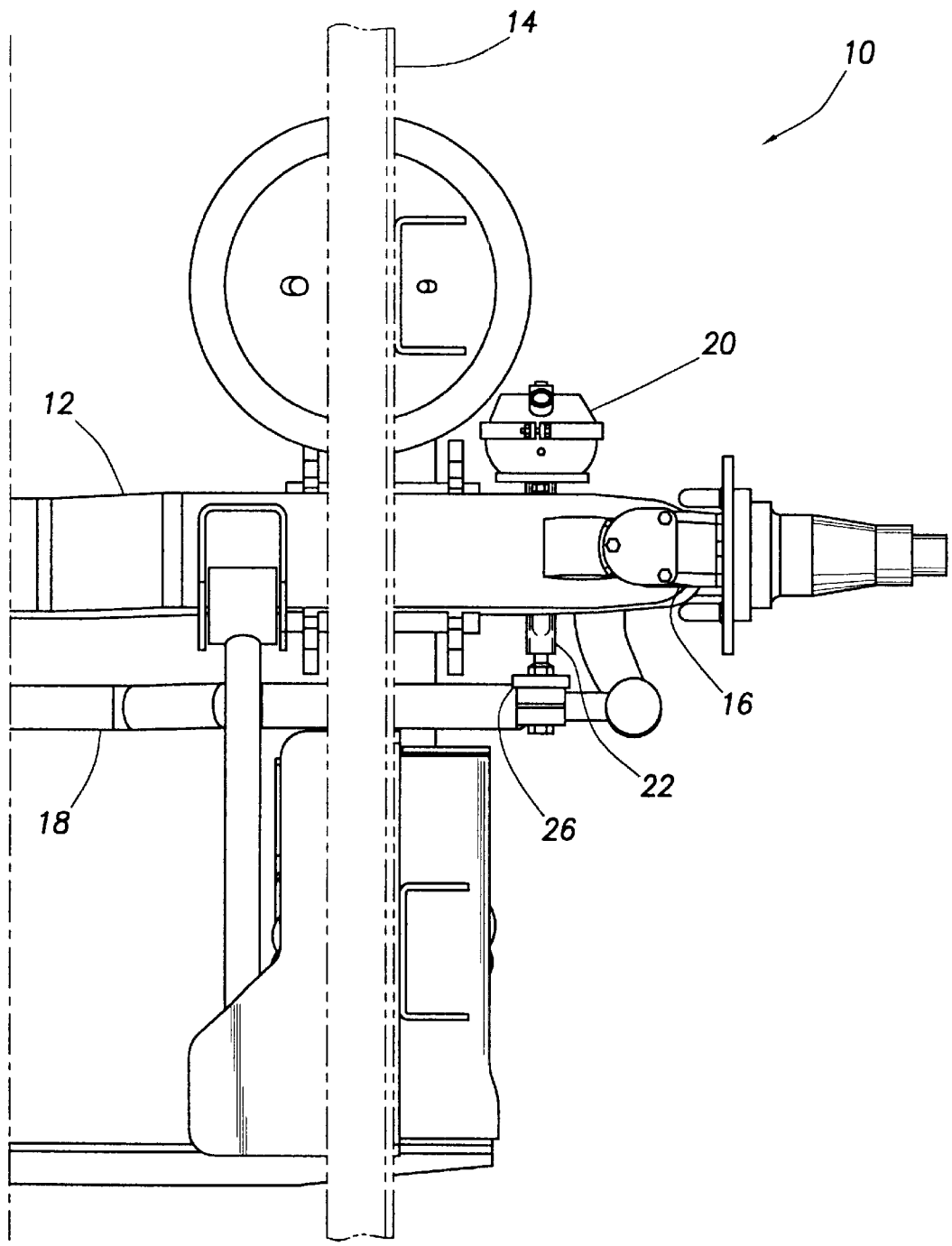
FIG. 1 is a top plan view of a steerable suspension system embodying principles of the present invention.

Representatively illustrated in FIG. 1 is a steerable suspension system 10 which embodies principles of the present invention. In the following description of the suspension system 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

For illustrative convenience, only one side of the suspension system 10 is depicted in FIG. 1, it being understood that the other side of the suspension system is essentially a mirror image of the side shown in FIG. 1. The suspension system 10 includes an axle 12 attached in a conventional manner to a vehicle frame 14 shown in phantom lines. A steering knuckle 16 is pivotably attached at each opposite end of the axle 12.

A tie rod 18 extends between the steering knuckles 16 at each end of the axle 12, so that the steering knuckles rotate together relative to the axle. The tie rod 18 displaces laterally relative to the vehicle frame 14 when the suspension system 10 is steered. Thus, if the tie rod 18 is prevented from displacing, the suspension system 10 maybe prevented from steering.

A conventional pneumatic actuator 20 is attached to a tube 22 extending through the axle 12. When it is desired to lockout steering of the suspension system 10, the actuator 20 displaces an engagement member or rod 24 (not visible in FIG. 1) in the tube 22, until the rod engages another engagement member or receiver 26 attached to the tie rod 18. Of course, other means of displacing one engagement member into engagement with another engagement member may be used, without departing from the principles of the present invention.

Figure 2:
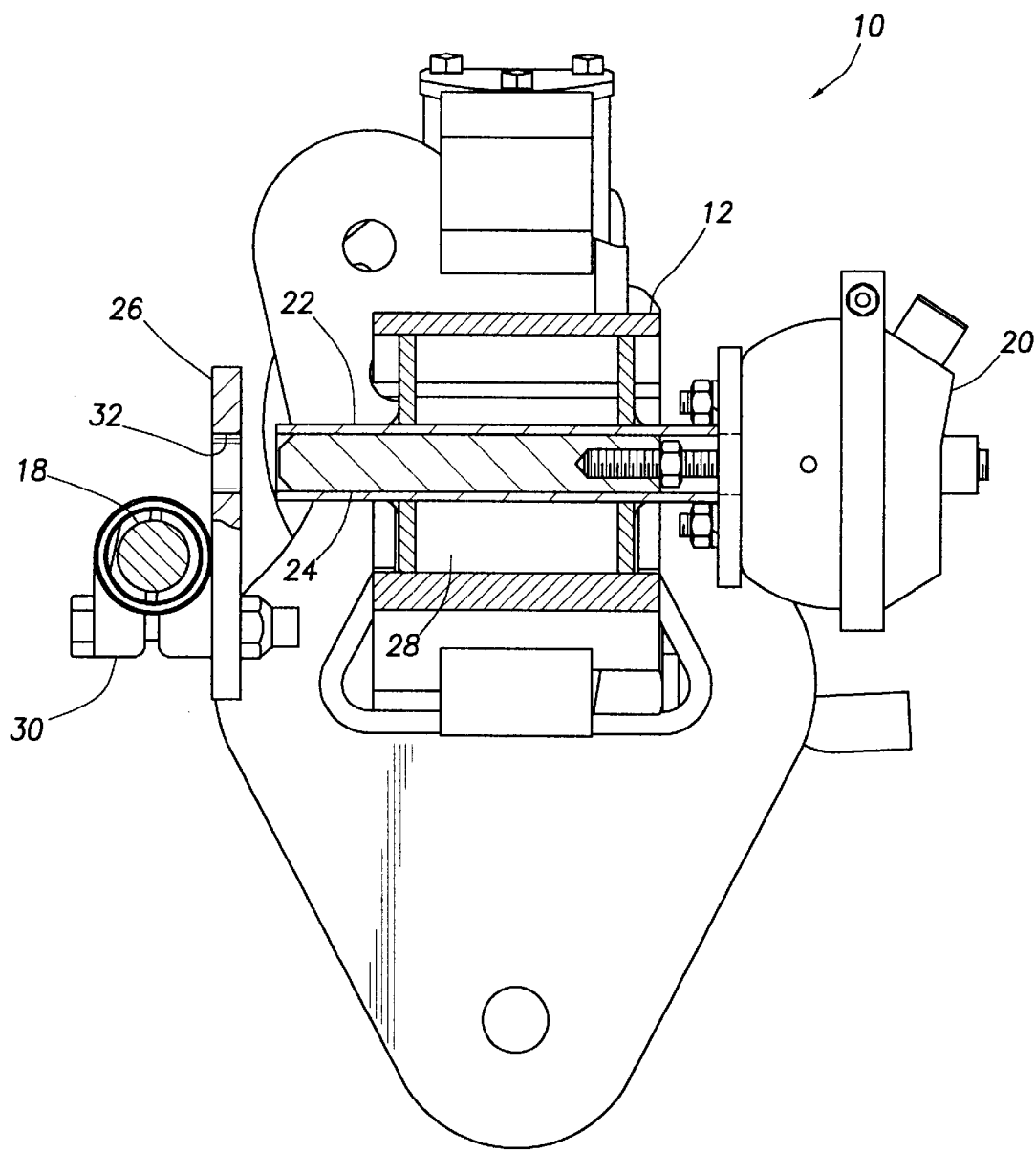
FIG. 2 is an enlarged scale cross-sectional view of the suspension system of FIG. 1.

Referring additionally now to FIG. 2, a cross-sectional view of the suspension system 10 is representatively illustrated. In this view it may be seen that the tube 22 extends through a void 28 in an interior of the axle 12. The tube 22 is depicted as being welded to opposite sides of the axle 12, but other means of attaching the tube to the axle may be used in keeping with the principles of the present invention.

It will be readily appreciated by one skilled in the art that the tube 22 provides a high degree of support to the rod 24 received therein. This support is far superior to that provided by a bracket attached to and extending outwardly away from the axle 12. The tube 22 also provides support to the rod 24 in close proximity to the receiver 26 attached to the tie rod 18.

In addition, note that no tripover mechanisms, actuators pushing plungers toward and against steering knuckles, locking shock systems and actuators attached to brackets are used in the suspension system 10 to lockout the steering. The steering lockout does not rely on actuator force to maintain the rod 24 engaged with the receiver 26, does not rely on relatively complex or heavy mechanisms, does not use a bracket to attach the tube 22 to the axle 12, and does not use a separate bracket to attach the actuator 20 to the axle 12.

The receiver 26 is a plate attached via a clamp 30 to the tie rod 18. The receiver 26 has an opening 32 formed therein. When the rod 24 is displaced outwardly from the tube 22 by the actuator 20, it is received in the opening 32. With the rod 24 engaged with the receiver 26, the tie rod 18 is prevented from displacing relative to the axle 12 and, thus, the suspension system 10 is prevented from steering.

Note that the principles of the present invention are not limited by the details of the particular suspension system 10 described above. For example, the receiver 26 could be integrally formed with the tie rod 18 instead of being clamped thereto, the engagement members 24, 26 may be differently configured, the axle 12 may be provided without the void 28 therein, another type of actuator 20 may be used, the tube 22 is not necessary, etc. Therefore, it is to be clearly understood that many modifications may be made to the suspension system 10, without departing from the principles of the present invention.

Figure 3:
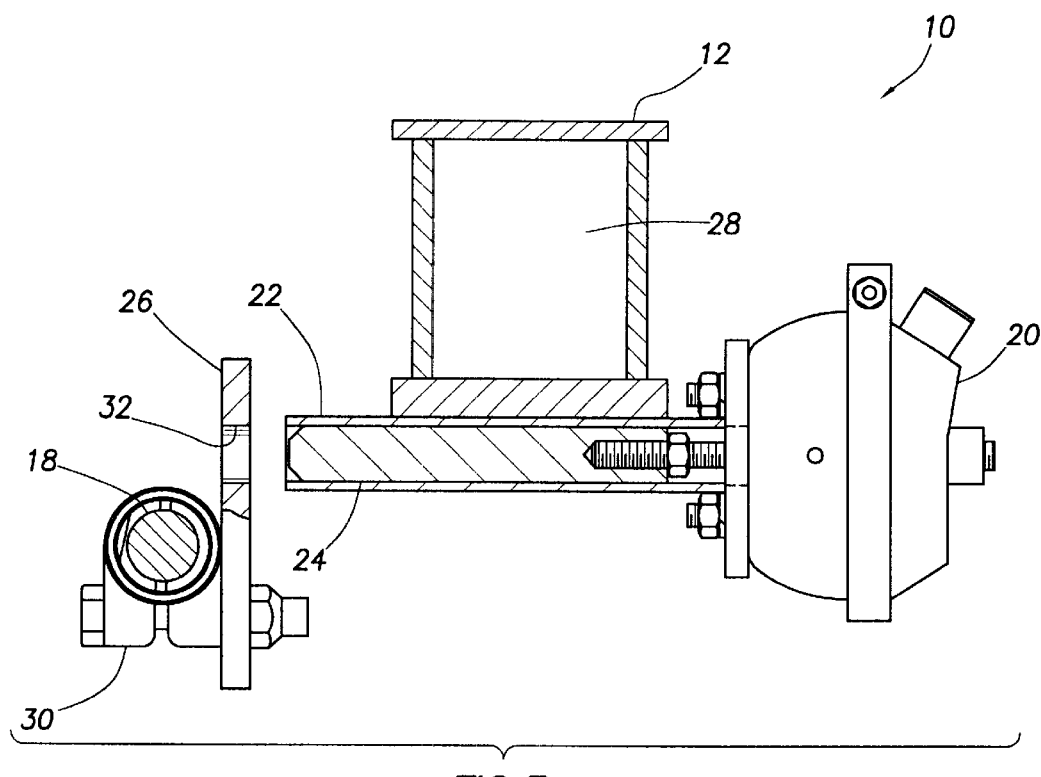
FIGS. 3 & 4 are enlarged scale cross-sectional views of alternate configurations of the suspension system of FIG. 1.
Figure 4:
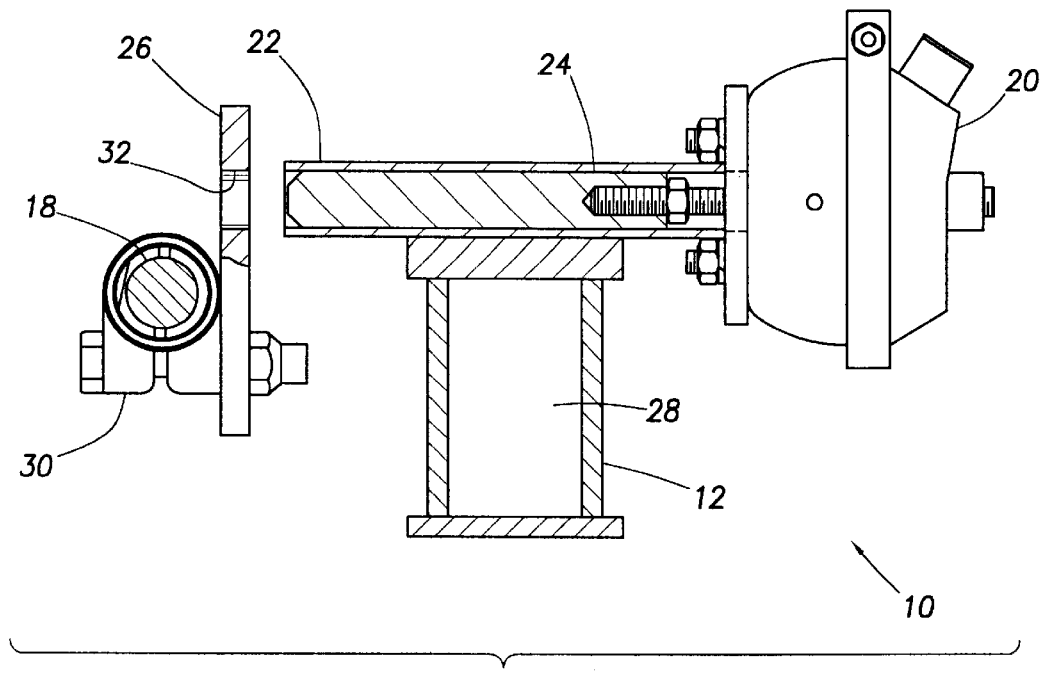

Referring additionally now to FIGS. 3 & 4, alternate configurations of the suspension system 10 are representatively illustrated. In the alternate configurations depicted in FIGS. 3 & 4, the tube 22 and rod 24 do not pass through the interior of the axle 12. Instead, they are externally disposed relative to the axle.

However, the tube 22 is directly attached to an exterior surface of the axle 12, for example, by welding, etc. In FIG. 3, the tube 22 is welded to an upper surface of the axle 12. In FIG. 4, the tube 22 is welded to a lower surface of the axle 12. Note that the rod 24 remains well supported by the tube 22, and no bracket is used to attach the tube 22 to the axle 12. Furthermore, no separate bracket is used to attach the actuator 20 to the axle 12.

Figure 5:
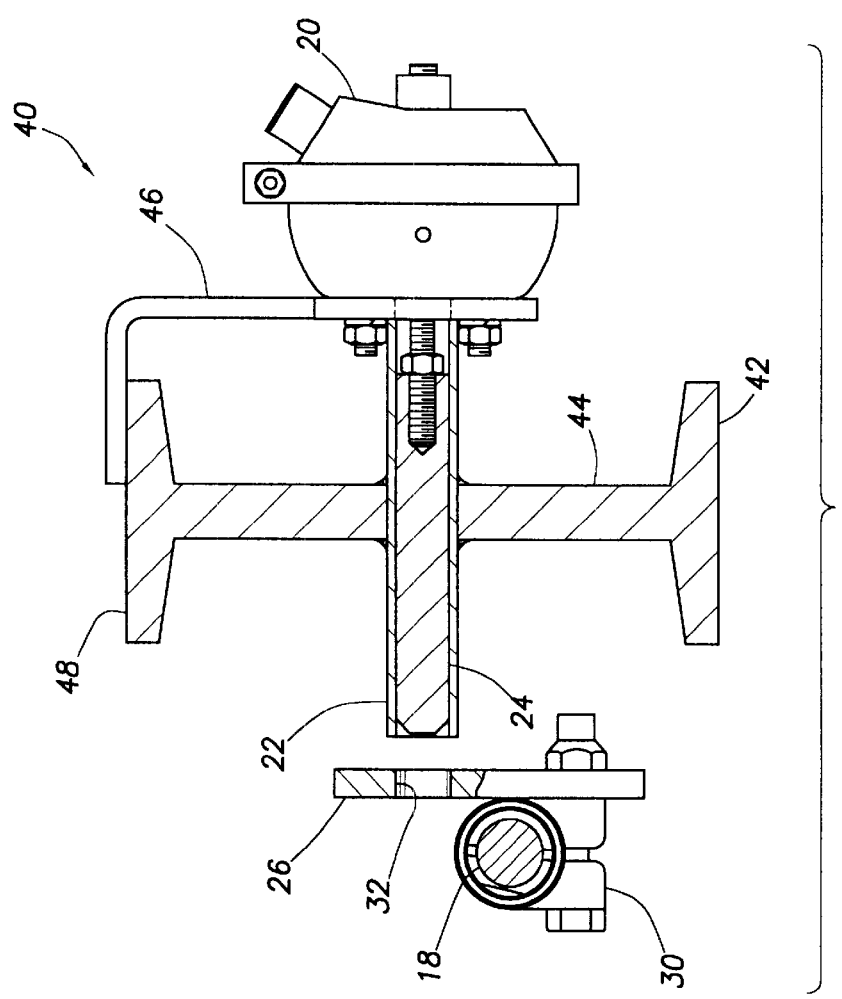
FIG. 5 is a cross-sectional view of another steerable suspension system embodying principles of the present invention.

Referring additionally now to FIG. 5, another suspension system 40 embodying principles of the present invention is representatively illustrated. Various elements of the suspension system 40 which are similar to elements previously described are indicated in FIG. 5 using the same reference numbers.

The suspension system 40 demonstrates the incorporation of the principles of the present invention into a suspension system using another type of axle. The suspension system 40 uses an I-beam axle 42. The tube 22 and rod 24 extend through a vertical web 44 of the axle 42. A bracket 46 may be used to provide additional support for the actuator 20, by securing it to an upper flange 48 of the axle 42.

Thus, it may be seen that principles of the present invention may be incorporated into many different types of suspension systems.

Figure 6:
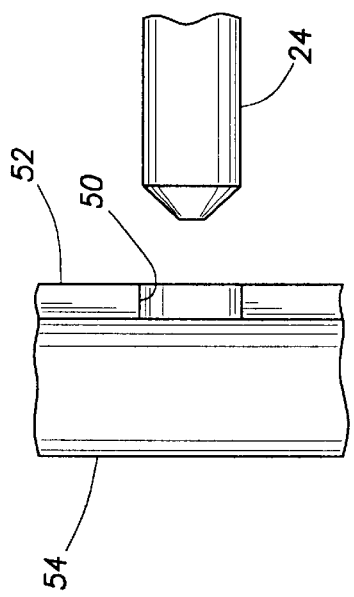
FIGS. 6 & 7 are top plan views of alternate engagement members which may be used in the suspension systems of FIGS. 1 & 3.
Figure 7:
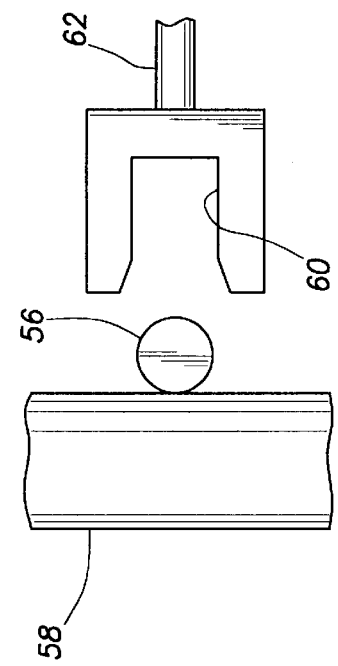

Referring additionally now to FIGS. 6 & 7, alternate configurations of engagement members that maybe used in place of the rod 24 and receiver 26 are representatively illustrated. In FIG. 6, the rod 24 is engaged with an open ended recess or slot 50 formed on a receiver 52 attached to a tie rod 54. Thus, it is not necessary for the rod 24 to engage an opening formed through a receiver.

In FIG. 7, a projection or rod 56 is attached to a tie rod 58. The rod 56 is engaged by a recess 60 on a forked engagement member 62 displaced by an actuator.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A steerable suspension system, comprising:
    an axle;
    an actuator rigidly attached to the axle so that the actuator does not rotate relative to the axle;
    a tie rod; and
    a first engagement member displaceable by the actuator through the axle in a manner preventing displacement of the tie rod relative to the axle.

2. The suspension system according to claim 1, further comprising a second engagement member attached to the tie rod, the first engagement member engaging the second engagement member when the first engagement member displaces through the axle.

3. The suspension system according to claim 1, wherein the actuator displaces the first engagement member through a tube extending through the axle.

4. The suspension system according to claim 1, wherein the first engagement member engages an opening formed in a second engagement member attached to the tie rod.

5. The suspension system according to claim 1, wherein the first engagement member engages a slot formed on a second engagement member attached to the tie rod.

6. The suspension system according to claim 1, wherein the first engagement member has a recess formed thereon which engages a projection attached to the tie rod.

7. A steerable suspension system, comprising:
    an axle;
    an actuator rigidly attached to the axle so that the actuator does not rotate relative to the axle;
    a steering knuckle attached to the axle; and
    a first engagement member extending at least partially within the axle and displaceable by the actuator between a first position in which the steering knuckle is permitted to rotate relative to the axle and a second position in which rotation of the steering knuckle relative to the axle is prevented.

8. The suspension system according to claim 7, wherein the first engagement member is displaced within an interior of the axle between the first and second positions.

9. The suspension system according to claim 8, wherein the first engagement member is displaced within a void in the interior of the axle between the first and second positions.

10. The suspension system according to claim 7, wherein the actuator displaces the first engagement member through a tube extending through the axle.

11. The suspension system according to claims 7 further comprising a tie rod attached to the steering knuckle, the first engagement member preventing displacement of the tie rod when the first engagement member is in the second position.

12. The suspension system according to claim 11 wherein the first engagement member engages a second engagement member attached to the tie rod when the first engagement member is in the second position.

13. A steerable suspension system, comprising:
    an axle;

an actuator rigidly attached to the axle so that the actuator does not rotate to the axle;

a tie rod;

a tube attached directly to an outer side surface of the axle; and a first engagement member displaceable through the tube by the actuator in a manner preventing displacement of the tie rod relative to the axle.

14. The suspension system according to claim 13, further comprising a second engagement member attached to the tie rod, the first engagement member engaging the second engagement member when the first engagement member displaces through the tube.

15. The suspension system according to claim 13, wherein the actuator is attached to the tube, the actuator being free of any bracket attached to the axle.

16. The suspension system according to claim 13, wherein the first engagement member engages an opening formed in a second engagement member attached to the tie rod.

17. The suspension system according to claim 13, wherein the first engagement member engages a slot formed on a second engagement member attached to the tie rod.

18. The suspension system according to claim 13, wherein the first engagement member has a recess formed thereon which engages a projection attached to the tie rod.

\* \* \* \* \*